April 1, 1969    L. K. SPENCER    3,435,843
VALVES
Filed Jan. 5, 1966

INVENTOR
Larry K. Spencer

BY *Hastings Ackley and Walter J. Jay*

ATTORNEYS

United States Patent Office 3,435,843
Patented Apr. 1, 1969

3,435,843
VALVES
Larry K. Spencer, Dallas, Tex., assignor to Otis Engineering Corporation, Dallas, Tex., a corporation of Delaware
Filed Jan. 5, 1966, Ser. No. 518,909
Int. Cl. F16k 31/36
U.S. Cl. 137—505.25                 13 Claims

ABSTRACT OF THE DISCLOSURE

A fluid flow regulator operable by fluid pressure of the fluid controlled by said regulator. Means is provided for controlling fluid flow, between selected rates of flow, responsive to fluid pressure in said flowing fluid.

---

This invention relates to valves and more particularly to flow control devices.

It is one object of the invention to provide a new and improved flow control device.

It is another object of the invention to provide a device for controlling fluid pressure within a conduit.

It is another object of the invention to provide a flow control device which permits control of fluid pressure within a conduit responsive to the pressure downstream of the device independent of the pressure on the upstream side of the device.

It is a further object of the invention to provide a device for controlling fluid flow in a conduit including a tubular, axially movable valve adapted to coact with a transversely positioned valve seat.

It is still a further object of the invention to provide a flow control device for a conduit having a valve assembly including a tubular member longitudinally movable within a body relative to a transverse valve seat by an annular piston secured on the tubular member and subjected to pressure on the downstream side of the valve seat.

It is another object of the invention to provide a flow control device having a transversely positioned valve seat assembly including an annular, resilient seat member confined between central and annular members providing a valve seat surface.

It is another object of the invention to provide a resilient seat member in a valve seat assembly which is exposed to fluid at the pressure against which the seat member seals to stress the member to a value sufficient to prevent leakage past it when the member is in engagement with a valve member.

It is another object of the invention to provide a flow control device having a valve assembly which when moved to a closed position has sufficient effective annular area exposed to the higher pressure side of the valve member and its seat to bias the valve member to a closed position with the seat with sufficient force to prevent leakage from the higher pressure side between the valve member and the seat.

It is still a further object of the invention to provide a fluid flow control device having a valve assembly which slides in sealing relationship through a guide ring within a seal forming a sealing relationship with the valve member along a circular line having a diameter less than a line of sealing engagement between the valve member and the valve seat whereby an area of the valve member is exposed to the higher pressure on one side of the valve seat and valve member to bias the valve member toward a non-leaking sealed relationship with the valve seat.

It is a further object of the invention to provide a flow control device for a conduit adapted to reduce the flow through the conduit from a first rate to a second rate responsive to pressure conditions within the conduit.

It is another object of the invention to provide a flow control device for permitting fluid flow through a conduit at two separate rates under given pressure conditions including a tubular, axially movable valve member having an annular, pressure responsive piston, flow restriction means across a central flow passage through the valve member, and a transversely positioned, fixed valve seat having flow restriction means secured centrally thereof.

It is another object of the invention to provide a flow control device for regulating fluid flow between the two flow rates responsive to fluid pressure downstream of the device including a first choke in the valve assembly of the device to provide for fluid flow at one rate and a second smaller choke in the valve seat assembly of the device providing fluid flow at a reduced rate when the valve assembly is at closed position relative to the valve seat diverting all flow through the second choke.

It is an additional object of the invention to provide a flow control device for regulating liquid flow through a conduit at a constant rate.

It is a further object of the invention to provide a constant rate fluid flow regulator for a conduit including flow restriction means across a central flow passage through the regulator downstream of a tubular valve assembly including an annular piston and being axially movable responsive to a pressure differential across the flow restriction means for positioning the valve assembly relative to a transversely positioned valve seat located upstream of the flow restriction means to regulate the pressure upstream of the flow restriction means relative to the pressure downstream of the flow restriction means to provide a constant pressure differential across the flow restriction means.

It is another object of the invention to provide a flow control device for regulating a liquid flow rate at a constant value including a sleeve assembly positioned downstream of a tubular valve assembly, the sleeve assembly having a choke for effecting a pressure differential downstream of the valve assembly and, further, the sleeve assembly receiving an annular piston on the valve assembly, the sleeve assembly having flow passage means providing fluid communication from downstream of the choke to an upstream end of the annular piston whereby the annular piston on the valve assembly is exposed at one end to pressure from the downstream side of the choke in the sleeve assembly and exposed at the other end to pressure from within the valve assembly on the upstream side of the choke in the sleeve assembly.

Additional objects and advantages of the invention will be readily apparent from the reading of the following description of a device constructed in accordance with the invention, and reference to the accompanying drawings thereof, wherein.

Figure 4:
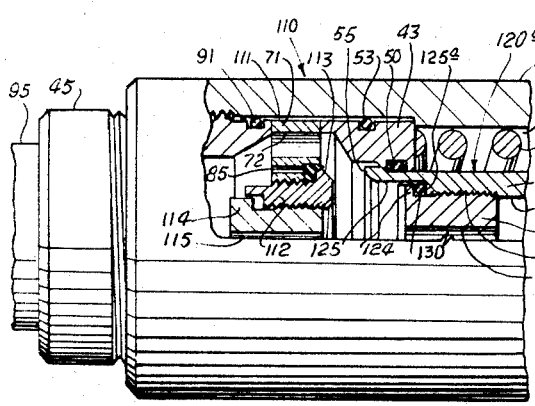
Figure 5:
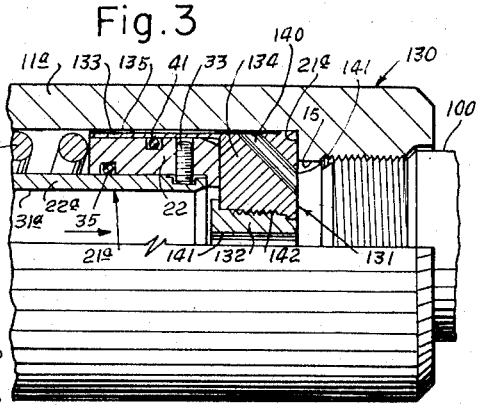

FIGURE 4 is a fragmentary view partially in section and partially in elevation illustrating a modified form of a flow control device embodying the invention for controlling fluid flow between first and second rates through a conduit; and, FIGURE 5 is a fragmentary view, partially in section and partially in elevation, illustrating another modified form of flow control device embodying the invention for regulating liquid flow at a constant rate through a conduit by maintaining a constant pressure differential across a flow restriction means.

Figure 1:
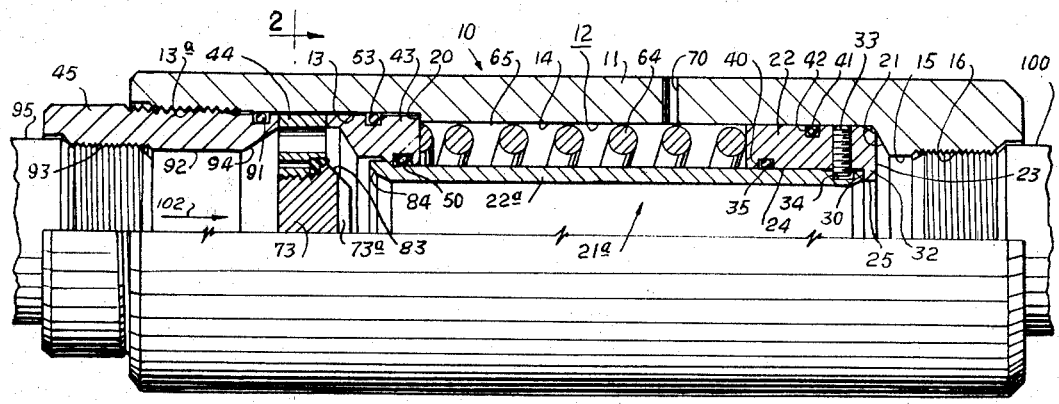
FIGURE 1 is a longitudinal view partially in section and partially in elevation illustrating a flow control device embodying the invention adapted for controlling fluid pressure in a conduit.
Figure 2:
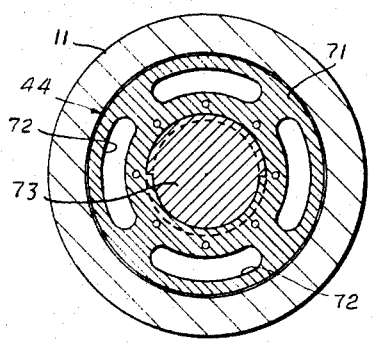
FIGURE 2 is a view in cross-section along the line 2—2 of FIGURE 1.

Referring to FIGURE 1 a flow control device 10 embodying the invention includes a body 11 having an axial bore 12 comprising a first end section 13 including a threaded end section 13a, a reduced central section 14, a further reduced second end section 15, a substantial portion of which is defined by a threaded body section 16. The size reduction between the bore section 13 and the bore section 14 provides one internal annular shoulder 20 around the bore 12. Another internal annular shoulder 21 around the bore 12 is provided between the bore sections 14 and 15.

A valve assembly 21a including an annular piston 23 and a tubular member 22a is slidably positioned within the bore section 14 of the valve body 11 for axial movement therein. The movement of the piston toward the right or in a downstream direction is limited by engagement of the downstream end 23 of the piston with the internal annular shoulder 21. An axial bore 24 through the annular piston is reduced along an end section 25 providing an internal annular shoulder 30. The annular piston 22 is telescopically fitted over an end section of the tubular member which is received within the bore 24 of the piston. The end 32 of the tubular member engages the shoulder 30 limiting the movement of the piston over the member. The piston is locked on the tubular member by one or more socket head set screws 33 threaded through the piston into an external annular groove 34 formed in the tubular member near its end 32. A ring seal 35 is received within an internal annular recess 40 within the piston around its bore for sealing between the tubular member and the piston. Another ring seal 41 is received within an external annular recess 42 formed in the annular piston to seal around the piston with the wall of the body 11 defining the bore section 14.

The tubular member 22a is slidable through an internal annular guide ring 43 held within the body 11 against the shoulder 20 by an annular seat assembly 44 secured within the bore section 13 by an annular retainer 45 which is threaded into the end section 13a of the body 11. A ring seal 50 between two backup rings 51 within an internal annular recess 52 in the guide ring 43 seals between the guide ring and the tubular member while permitting the tubular member to slide relative to the guide ring. Another ring seal 53 is received within an external annular recess 54 in the guide ring to seal between the guide ring and the wall of the body defining the bore section 13.

The tubular member 22a is outwardly flared at its upstream end providing an external annular end flange 55 having an end seat surface 60 and an external annular shoulder 61. The flange 55 is received within an internal annular recess 62 formed in the guide ring 43 around its bore. The downstream or right end of the recess 62 is defined by internal annular shoulder 63 which is inwardly convergent at an angle substantially equal to the angle of the shoulder 61 on the valve member. The flange 55 is received within the recess 62 when the tubular member is moved to the right in a downstream direction to a full open position, as illustrated in FIGURE 1.

The valve assembly 21a is biased toward the right in a downstream direction to the open position by a spring 64 confined at opposite ends between the piston 22 and the guide ring 43 within an annular chamber 65 defined within the body 11 around the tubular member 22a by the piston and guide ring. The chamber 65 is vented to the atmosphere around the body 11 through a lateral port 70.

The seat assembly 44 includes an annular ring 71 having a plurality of circumferentially spaced ports or openings 72 and a central solid member 73 which is threaded into the bore 74 of the annular ring. The central member has a screwdriver slot 73a extending laterally across its downstream face to facilitate assembly of the seat assembly. The ports 72 are as large as practicable consistent with structural strength of the ring 71 which need only serve as a support for the valve seat member and central section. The ports 72 do not function as flow restriction means but rather as flow passage means to permit maximum flow through the valve seat assembly. The ring 71 has an internal annular recess 75 around its bore opening in a downstream direction to receive a resilient seat member 80 comprising a ring seal which is confined within the recess by an external annular lip or flange 81 on the central member 73. The flange 81 is smaller in diameter that the diameter of the recess 75 at its side wall so that when the annular ring and the central member are secured together a portion of the seat member is exposed on the downstream side of the valve seat assembly providing a seat surface 82 to receive the end seat surface 60 on the valve member 22a for closing the flow control device to fluid flow therethrough.

The central member 73 of the seat assembly has a tapered or inwardly convergent annular downstream end section surface 83 while the flange 55 of the tubular member 22a has a corresponding internal annular outwardly divergent end surface 84. The tubular member and central member are so related that the tubular member moves to its upstream end position to effect sealing engagement between the surfaces 60 and 82 before contact between the tubular member surface 84 and the central member surface 83. After sealing relationship is established between the surfaces 60 and 82, the surface 84 seats on the surface 83 to prevent extension of the seat member 80 between the central and tubular members.

The seat member 80 preferably is an O-ring positioned within the recess 75 and compressed between the ring 71 and the central member 73 as the ring and central member are threaded together so that when they are fully engaged, as illustrated, the O-ring is partially extruded in a downstream direction through the gap provided between the flange 81 and the side wall of the recess 75 to form the seat surface 82. Instead of comprising an O-ring, the seat member may be a resilient ring-shaped member molded to the cross sectional configuration illustrated.

Figure 3:
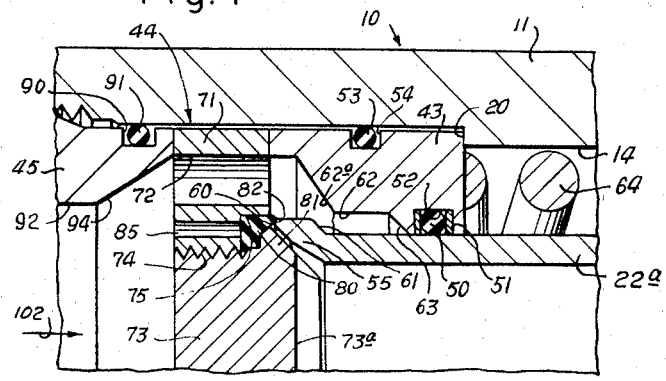
FIGURE 3 is an enlarged fragmentary view in section showing the flow control device of FIGURE 1 at the closed position.

The annular ring 71 of the seat assembly 44 has a plurality of axially extending, circumferentially spaced flow passages 85 communicating with the recess 75 behind the seat member 80 to expose the back of the confined O-ring to the fluid pressure within the regulator on the upstream side of the seat assembly to insure the stressing of the O-ring to at least the upstream pressure to prevent leakage past the seal when the valve member is in the closed position. When the tubular member 22a is at the closed position as illustrated in FIGURE 3 a line of sealing engagement between the ring seal 50 and the tubular member is smaller in diameter than a line of sealing engagement between the seat surfaces 60 and 82 so that an effective annular area on the tubular member defined between these lines of sealing engagement is exposed to the pressure within the flow control device upstream of the tubular member providing a small bias in an upstream direction to the valve assembly from the pressure of the upstream fluid when the valve assembly is at a closed position. This upstream bias minimizes leakage past the tubular member and, insures a fully sealed relationship between the seat member 80 and the tubular member. Thus, the valve assembly, once closed, is firmly held at a closed position at which leakage does not occur and a slight lag is provided between closing and opening pressure on the downstream side of the valve member. The downstream pressure must drop slightly below the closing pressure for the valve assembly before it will move to the open position to minimize leakage and chattering.

The exposure of the seat member 80 through the passage 85 to the upstream pressure effects sufficient stress in the material forming the member that an effective sealing relationship may be established between the seat surfaces 60 and 82. The slight additional stress induced in the seat member by the biasing of the valve member against it increases its stress to a level slightly above the upstream higher pressure so that the upstream fluid will not leak past the seal between the surfaces 60 and 82. It is well known that resilient sealing materials must be stressed to a value equal to or greater than the pressure against which they seal.

The retainer 45 is provided with an external annular recess 90 which receives a ring seal 91 to seal between the retainer and the body 11. The retainer has a bore 92 having a threaded end section 93 and an outwardly flared enlarged end section 94. The bore section 94 permits fluids flowing through the bore to readily enter the ports 72 in the annular ring 71.

The flow control device 10 is connected into a conduit by threading a section 95 of the conduit into the threaded section 93 of the retainer 45 and threading another section 100 of the conduit into the internally threaded end section 16 of the body 11. In the absence of pressure in the conduit biasing the valve assembly closed, it is at an open position as shown in FIGURE 1.

Fluid flowing through the flow control device 10 enters the device from the conduit section 95 and flows through the bore 92 of the retainer 45 as indicated by the arrow 102. The fluid flows radially outwardly through the retainer end section 94 into the ports 72 and radially inwardly through the flared bore section 62a of the guide ring 43 into the upstream end of the tubular member 22a. The fluid flows through the tubular member and the end section 15 of the body 11 into the conduit section 100.

The spring chamber 65 around the tubular member is exposed to atmospheric pressure through the port 70 so that the valve assembly 21a is biased toward the right by both the spring 64 and the pressure within the annular chamber 65 acting over an effective annular area of the valve assembly defined between the line of sealing engagement of the ring seal 41 with the body 11 and the line of sealing engagement of the ring seal 50 with the valve member 22a. The pressure of the fluid flowing through the flow control device provides a force which biases the valve assembly to the left toward a closed position. The fluid pressure within the device acts over an effective area of the valve assembly defined between the line of sealing engagement of the ring seal 41 with the body 11 and the line of sealing engagement of the ring seal 50 with the tubular member 22a. A spring 64 is selected with the desired characteristics and it is confined between the guide ring 43 and the annular piston 22 under the necessary compression to hold the valve assembly toward the right at the open position until the fluid pressure within the flow control device downstream of the seat assembly 44 exceeds predetermined value at which it is desired that the device close to prevent further pressure increase downstream of the seat assembly.

When the pressure of the fluid within the flow control device downstream of the seat assembly exceeds the value sufficient to compress the spring 64, the valve assembly 21a is moved to the left by the force of the fluid pressure acting over the effective annular area between the ring seals 41 and 50 as previously described in detail. The valve assembly is moved in an upstream direction to the left to the closed position illustrated in FIGURE 3 until the pressure within the device acting over this annular area is reduced to a value which permits the force from the spring 64 to again move the valve assembly farther downstream to the right or away from the seat assembly 44 to a more open position. As the valve assembly moves toward the left toward the closed position the end seat surface 60 on the tubular member 22a approaches the resilient seat surface 82 restricting the fluid flow between the seat surfaces into the tubular member lowering the pressure within the tubular member and therefore reducing the force biasing the valve assembly toward the closed position.

If the force acting on the valve assembly 21a between the ring seals 41 and 50 is sufficiently great, the assembly moves to the full left end position at which the end seat surface 60 on the tubular member 22a engages the seat surface 82 at which time a slight additional force biasing the valve assembly toward the closed position is applied to the tubular member by the upstream pressure acting over an annular area defined within the line of sealing engagement of the ring seal 50 with the outside surface of the tubular member around the line of sealing engagement established between the seat surfaces 60 and 82. As previously explained, the seat member 80 is stressed to the upstream pressure level within the bore 92 as the pressure is applied through the fluid passages 85 to the back or upstream side of the member while substantially the same pressure is applied to the front face or seat surface of the seat member within the bore section 62a of the guide ring 43 around the valve member end sections 55. The additional force with which the valve assembly is urged against the seat member 80 by the fluid pressure downstream of the seat assembly and the upstream pressure acting around the line of sealing engagement between the seat surfaces 60 and 82 within the line of sealing engagement of the ring seal 50 with the valve member stresses the seat member 80 additionally to a sufficient degree to establish a sealed relationship between the seat surfaces 60 and 82 thereby preventing leakage of fluid between such seat surfaces into the tubular member. The provision of the effective area on the tubular member within the seal ring 50 around the line of sealing engagement between the seat surfaces 60 and 82 adds sufficient biasing force to the valve assembly to hold it on its seat in the closed position without seepage past the seat member 80 and consequent chattering action of the valve assembly. This biasing force thus holds the valve assembly on the seat until the fluid pressure downstream of the seat assembly drops sufficiently that the spring 64 may move the valve assembly to a full open position. The movement of the valve assembly to a fully closed and a fully opened position depends, of course, upon the pressure conditions within the flow control device downstream of the seat assembly 44. Frequently the valve assembly may be longitudinally located at an intermediate position between the open position of FIGURE 1 and the closed position of FIGURE 3 causing a throttling effect in the fluid flow between the seat surfaces 60 and 82 with the valve assembly oscillating back and forth to regulate the pressure on the downstream side of the seat assembly to the desired value. Of course, when the pressure in the flow control device downstream of the seat assembly increases sufficiently above the predetermined value which the device is designed to maintain, the valve assembly moves to the full closed position at which it remains until such pressure decreases sufficiently to allow the spring to again move the valve assembly to the full open position.

When the flow control device 10 is connected between the conduit sections 95 and 100 it functions to regulate the pressure on the downstream side of the seat assembly 44 to prevent such pressure from exceeding a predetermined desired value independent of the pressure within the system upstream of the seat assembly 44. For example, a flow control device 10 may be included in a system, not shown, providing for the automatic transfer of well fluids from a well to treatment and storage facilities. In such a system the flow control device is preferably positioned near the well in a conduit which may extend for a substantial distance, such as several miles, to the treatment and storage facilities of the system. In such a fluid transfer system the preferred objective is to maintain a major portion of the length of the flow conducting conduits which extend along the surface to the storage treatment facilities at a minimum fluid pressure and to regulate such pressure so that it does not exceed such minimum even when the wells are shut-in and the system is not functioning. During periods when a well is not producing a valve in the conduit leading to the treatment and storage facilities may be closed thereby permitting the pressure within the conduit extending to the well to increase to the value at which the flow control device is designed to close. The valve assembly 21a moves to the closed position so that subsequent increases in pressure within the well as applied through the conduit section 95 to the flow control device 10 are not imposed on the portion of the conduit extending downstream from the seat assembly 44 to the treatment and storage facilities. Thus, the flow control device 10 reacts responsive to the pressure downstream of the device to maintain the pressure below the desired value independent of the pressure to which the fluids increase within the well upstream of the seat assembly 44. Since the flow control device functions in direct response to pressure communicated to it from downstream of its seat assembly 44, there is no necessity for any other form of information transmission to the flow device from a remote point through hydraulic, electric lines, or the like.

It will, therefore, be seen that a new and improved flow controlled device has been described and illustrated.

It will be seen that a flow control device embodying the invention permits control of fluid pressure within a conduit responsive to the pressure downstream of the device independent of pressure on the upstream side of the device.

It will be further seen that a flow control device embodying the invention includes a tubular, axially movable valve assembly adapted to coact with a transversely positioned valve seat for regulating fluid pressure downstream of the valve seat.

It will also be seen that the flow control device of the invention has a valve assembly which includes an annular piston movable in an upstream direction responsive to pressure on the downstream side of the seat assembly of the flow control device.

It will be further seen that a flow control device embodying the invention includes an annular flexible seat member confined between rigid central and annular members providing a transversely oriented valve seat adapted to receive an upstream end of the tubular valve member for controlling fluid flow past the valve seat into the valve member.

It will be additionally seen that the flexible seat member of the seat assembly of the control device is exposed to the pressure of fluid in the device on the upstream side of the seat assembly for stressing the seat member to a value sufficient to prevent leakage past the valve seat when the valve member is engaged with the seat member.

It will be further seen that when the valve member of the flow control device is at a closed position sufficient effective annular area on the valve member is exposed to the upstream pressure within the flow control device to bias the valve member toward the valve seat member with adequate force to increase the stress within the seat member to a value sufficient to prevent fluid leakage between the seat member and the valve member from the upstream to the downstream sides of such members.

It will be additionally seen that a tubular valve member of the flow control device slides in sealing relationship through a guide ring having a ring seal which seals with the tubular member along a circular line having a diameter less than a circular line of sealing engagement between the upstream end of the tubular member with its valve seat member whereby an effective annular area on the tubular member is exposed to pressure upstream of the line of contact between the tubular member and valve seat member for biasing the tubular member toward a non-leaking, sealed relationship with its valve seat member.

FIGURE 4 illustrates a modified form of flow control device embodying the invention useful for controlling fluid flow through a conduit between first and second flow rates. For example, in controlling fluid flow from a well, particularly a well which has been "shut-in" and thus not producing for a period of time, it may be necessary for restoration of the well to production to initially produce it at a relatively high rate and subsequently reduce the production rate to a lower value.

FIGURE 4 shows a portion of a flow control device 110 which is a modification of the device 10 of FIGURES 1 and 3 to include chokes in both its tubular valve member and seat assembly for controlling the fluid flow rate through the device between first and second values. The components of the flow control device 110 which are identical to the components of the device 10 are referred to in FIGURE 4 by the same reference numerals as used in FIGURE 1, while modified components are given different reference numerals. A transversely positioned valve seat assembly 111, corresponding to the seat assembly 44 of the device 10, is confined within the body 11 between the guide ring 43 and the retainer 45. The seat assembly 111 includes the annular ring 71, the resilient seat member 80, and an internal annular ring member 112 which is threaded through the annular ring 71. The resilient seat member 80 is confined between the annular ring 71 and the internal annular ring 112 in precisely the same manner as the seat member 80 is secured between the ring 71 and the central member 73 as described and illustrated with respect to FIGURES 1 and 3. The internal annular ring 112 has an external annular flange 113 corresponding in shape and function to flange 81 for holding the seat member 80 in the recess 85 of the annular ring 71. A flow restriction member or choke 114 provided with an axially extending flow passage 115 is threaded through the internal annular ring 112.

The flow control device 110 also includes a tubular member 120 of a valve assembly 120a which supports a flow restriction member or choke 121 threaded into an upper end section 122 of the tubular member. The choke 121 has an axial flow passage 123 which is larger in cross section than the flow passage 115 in the choke 114. An external annular flange 124 on the choke is received within an enlarged end section 125 of the bore 120a through the tubular member to confine a ring seal 130 against an annular shoulder 125a in the tubular member for sealing between the choke and the tubular member. The tubular member has an upstream end section or flange 55 identical to the flange 55 on the tubular member 22a of the flow control device 10 so that the relationships between the tubular member and the resilient seat member 80, the guide ring 43, and the ring seal 50 are identical to the same relationships illustrated and described with respect to the flow control device 10. The downstream portions of the tubular member 120, which are not shown in FIGURE 4, are identical in all respects to the same portions of the tubular member 22a as described above and illustrated in FIGURE 1.

In operation the flow control device 110 is connected between the conduit sections 95 and 100 in the same manner as the control device 10 so that the fluid flow through the device from the conduit section 95 into the conduit section 100 is regulated between a first rate and a second rate responsive to the pressure within the fluid downstream of the seat assembly 111. The design characteristics of the components of the flow control device 110 including the spring 64 are selected so that the device will so respond to the fluid pressure on the downstream side of the seat assembly 111 to permit the valve assembly 120a to be at a downstream open position as shown in FIGURE 4 when the fluid pressure is below a predetermined value and to be biased in an upstream direction to a position at which the seat surfaces 60 and 82 are engaged when the fluid pressure is above such predetermined value.

The position of the tubular member 120 of the flow control device 110 in FIGURE 4 permits a maximum flow rate through the device along a path from the bore 92 of the retainer 45 through the ports 72 between the seat surfaces 60 and 82 into the upstream end of the bore 120b of the tubular member and through the flow passage member 123 of the choke 121. A small quantity of fluid may flow through the flow passage 115 of the choke 114. All fluid must flow through the passage 123 of the choke 121. The valve assembly remains at an open position so that flow occurs along these flow paths so long as the fluid pressure applied to the valve assembly over an effective area defined between the lines of sealing engagement of the ring seal 41 with the body 11 and the ring seal 50 with the valve member 120 provides a force less than the force of the atmospheric pressure in the annular space 65 applied to the same effective annular area on the valve assembly coupled and the force of spring 64. When the force of the pressure of the fluid flowing through the flow control device on the valve assembly increases to value sufficient to overcome the forces of the atmospheric pressure and the spring 64 on the valve assembly, the assembly is moved in an upstream direction until the end seat surface 60 on the tubular member engages the seat surface 82 on the resilient seat member 80 thereby preventing further fluid flow from the ports 72 between the seat surfaces 60 and 82 into the tubular member.

With the valve assembly at its upstream end or closed position, fluid flow through the control device 110 is thereby limited to flow from the bore 92 of the retainer 45 through the flow passage 115 of the choke 114 and through the passage 123 of the choke 121 into the bore 120a of the tubular member 120 and into the conduit section 100, as previously described. So long as the pressure downstream of the seat assembly remains at a high enough level to bias the valve assembly to the left end position, flow through the device is restricted through the choke 114. Of course, when the downstream pressure once again drops below the predetermined value at which the valve assembly moved to its upstream end position, the valve assembly once again moves in a downstream direction to permit maximum flow through the device as limited only by the flow passage 123 of the choke 121.

The flow control device 110 is particularly useful for such applications as inclusion in a flow line of a well which is alternately produced and "shut-in" for substantial periods of time during which sufficient liquid, such as water, may collect within the well to prevent its satisfactory restoration to normal production unless the back-pressure on the well is initially minimized. Lowering the back-pressure in the early stages of restoring production permits the liquids to be displaced from the well by the formation pressure until satisfactory flow from the well is established after which the back-pressure on the flow control device may be increased by any satisfactory means to shift it from the open or maximum flow rate position to the position of the valve assembly at which the fluids are flowing through the choke 114 at a reduced rate. Such practices sometimes are referred to as "surging" a well. Where the back-pressure on the flow control device is at a minimum and thus the pressure differential across the device is maximum, the valve assembly is at the downstream or right end open position as illustrated in FIGURE 4 at which position the limiting factor on the flow rate through the device is the choke 121. On the other hand, when the back-pressure in the fluid system against the flow control device is increased to a predetermined value, the pressure drop across the device is reduced with the valve member moving to the upstream closed position whereby fluid flow occurs across the choke 114 at a reduced pressure differential with a consequent reduced flow rate occurring through the device.

It will now be seen that a flow control device embodying the invention for regulating fluid flow between two selected rates has been described and illustrated.

It will be further seen that a modified form of flow control device for varying fluid flow between two rates responsive to fluid pressure downstream of the valve seat assembly of the device includes a first choke in the valve assembly of the device to provide for fluid flow at one rate and a second smaller choke in the seat assembly of the device providing fluid flow at a reduced rate when the valve assembly is at its upstream closed end position relative to the valve seat.

FIGURE 5 illustrates a flow control device 130 embodying the invention for regulating liquid flow to a predetermined rate by maintaining a predetermined pressure differential across a choke downstream of the valve assembly of the device responsive to the pressure downstream of such choke. The flow control device 130 is identical to the flow control device 10 of FIGURES 1 and 3 in all respects with the exception of a sleeve assembly 131 which slidably receives the annular piston 22 of the tubular member 22a and includes a choke 132 through which fluid flows from the bore 31a of the valve member into the bore section 15 of the body 11 on the downstream side of the choke 132. The sleeve assembly 131 includes a sleeve section 133 which fits in sliding telescopic relationship over the piston 22 with the ring seal 41 providing a sealing with the inner surface of the sleeve around the piston. The sleeve section 133 is formed on an annular head member 134 which is limited against movement away from the tubular member 22a by an internal annular shoulder 21a in the body 11a. The sleeve section along with a major upstream portion of the outer portion of the head member 134 are reduced in outside diameter to provide a thin annular space 135 which communicates at its upstream end into the spring chamber 65. A flow passage 140 extends through the head member 134 from the annular space 135 through the downstream end 141 of the head member thereby permitting fluid communication from within the bore section 15 of the body 11a through the head member 134 and the annular space 135 into the spring chamber 65. The choke 132 which has an axial flow passage 141 is threaded through a bore 142 of the head member 134. The body 11a of the flow control device 130 is identical in all respects to the body 11 of the flow control device 10 with the exception that the body 11a is not provided with the vent flow passage 70 so that the spring chamber 65 is in fluid communication, as previously explained, only with the bore 15 of the flow control device of body on the downstream side of the head member 134.

The flow control device 130 is particularly suited to the regulation of liquid flow at a predetermined rate which is useful in such applications as the secondary recovery of oil by water flooding wherein water is injected into wells at regulated rates of flow. The flow control device 130 maintains a predetermined constant pressure differential across the choke 132 whereby liquid flows at a constant rate through the flow passage 141 of the choke into the bore section 15 of the body of the flow control device.

The valve assembly is biased in an upstream direction toward closed position by the pressure of the fluid within the body 11a upstream of the choke 132 acting over an effective area of the valve assembly between the line of sealing engagement of the ring seal 50 with the tubular member 22a and the line of sealing engagement of the ring seal 41 with the sleeve section 133. The valve assembly is biased in a downstream direction toward the open position by the spring 64 and by the force of the fluid pressure within the spring chamber 65 which is substantially equal to the fluid pressure within the bore 15 downstream of the head member 134 acting over the same effective annular area on the valve assembly between the line of sealing engagement of the ring seal 50 with the tubular member 22a and the line of sealing engagement of the ring seal 41 with the sleeve section 133.

When the flow control device 130 is at the full open position represented in the FIGURES 1 and 5, fluid flows through the device from the bore 92 through the axial ports 72, between the seat surfaces 60 and 82 into the upstream end of the tubular member 22a from which the fluid flows through the flow passage 141 in the choke 132 into the bore section 15 of the body 11a of the device. When conditions downstream of the control device decrease the pressure within the bore section 15 such decrease is reflected in the annular space 65 due to the fluid communication through the passage 140 and annular space 135. The reduced pressure in the spring chamber 65 reduces the force of the fluid pressure biasing the valve assembly in a downstream direction. With the force biasing the valve assembly away from the valve seat in a downstream direction reduced, the fluid pressure upstream of the head member 134 applied from within the bore 31a of the tubular member 22a to the valve assembly exerts a force on the valve assembly between the ring seals 41 and 50 to force the assembly toward the seat assembly in an upstream direction thereby restricting the fluid flow between the upstream end of the tubular member 22a and the seat surface 82 thereby reducing the fluid pressure within the tubular member upstream of the head member 134 so that the desired pressure differential is maintained across the choke 132. Thus, a reduction in pressure downstream of the choke 132 reduces the pressure within the annular chamber 65 whereby the valve assembly is moved in an upstream direction to reduce the pressure within the flow control device on the upstream side of the choke 132 in proportion to the pressure reduction on the downstream side of the choke 132 so that the pressure differential across the choke is maintained at a uniform value. An increase in pressure within the bore 15 downstream of the choke 132 is transmitted through the bore 140 and the annular space 135 into the annular chamber 65 causing the annular piston 22 and the valve member 31 to move in a downstream direction thereby increasing the space between the seat surfaces 60 and 82 and allowing proportionate increase in the pressure within the control device upstream of the choke 132 thereby continuing to maintain the desired pressure differential across the choke. Thus, pressure increases and decreases on the downstream side of the choke 132 cause proportionate pressure increases and decreases on the upstream side of the choke to maintain the pressure differential across the choke at a substantially uniform value whereby liquid flowing through the flow control device flows at a substantially constant rate independent of the actual value of the pressure either upstream or downstream of the choke 132.

An increase in the pressure upstream of the choke 132 displaces the valve assembly 21a in an upstream direction restricting the flow between the seats 60 and 82 and thereby reducing the pressure upstream of the choke 132 so that the flow control device also functions to maintain a substantially constant pressure differential across the choke with pressure fluctuations on the upstream side of the choke. Similarly, a pressure decrease within the device upstream of the choke 132 permits the fluid pressure within the annular space 65 to move the valve assembly in a downstream direction thereby increasing the space between the seat surfaces 60 and 81 to allow a pressure increase upstream of the choke 132 to continue to maintain the desired pressure differential across the choke.

It will now be seen that a further form of flow control device embodying the invention for maintaining a constant liquid flow rate has been described and illustrated.

It will be also understood that the flow control device adapted to provide a substantially constant liquid flow rate maintains a substantially constant pressure differential across a choke positioned downstream of an axially movable valve assembly having an annular piston exposed on the downstream side to fluid pressure upstream of the choke and exposed on an upstream side to the fluid pressure downstream of the choke.

It will additionally be understood that the form of the flow control device providing for a constant liquid flow rate includes a sleeve assembly positioned downstream of a tubular valve assembly and having a choke for effecting a pressure differential downstream of the valve assembly and for receiving an annular piston on the valve assembly, the sleeve assembly having means providing fluid communication from downstream of the choke around the annular piston to the upstream side thereof.

What is claimed and desired to be secured by Letters Patent is:

1. A fluid flow control device comprising: body means having a flow passage therethrough; valve seat means positioned transversely of said passage; valve means movable longitudinally of said flow passage relative to said seat means between a closed position in engagement with said seat means and an open position spaced from said seat means, said valve means being movable responsive to fluid pressure within the flow passage; said valve seat means having an annular seat surface and circumferentially extending longitudinal port means disposed radially outwardly of said seat surface, said valve means including a tubular section having an end seat surface engageable with said annular seat surfce and an annular piston section in slidable sealing engagement with said body means in the flow passage therethrough; annular seal means supported by said body means around said tubular section spaced along said tubular section from said end seat surface, the line of sealing engagement between said seal means and said tubular section of said valve means encompassing less area than the area encompassed by the line of sealing engagement between said annular seat surface of said valve seat means and said end seat surface on said tubular section when said seat surfaces are engaged with each other, whereby fluid pressure within said device around said tubular section between said engaged seat surfaces and said line of sealing engagement between said seal means and said tubular section biases said valve means toward said valve seat means.

2. A fluid flow control device as defined in claim 1 including spring means operatively connected between said piston section of said valve means and said body means for biasing said valve means away from said valve seat means and said valve means is exposable over first surfaces to the pressure of fluid within said flow passage controllable by the relative position of said valve means to said valve seat means for biasing said valve means toward said valve seat means and said valve means is exposable over second surfaces to another fluid pressure for co-acting with said spring means for biasing said valve means away from said valve seat means.

3. A flow control device as defined in claim 2 wherein said first surfaces of said valve means and said second surfaces of said valve means are substantially in equal effective annular area for biasing said valve means toward and away from said valve seat means and said annular areas are defined between a line of sealing engagement between said piston section and an inside wall of said valve means defining said flow passage therethrough and the line of sealing engagement of said annular seal means with said tubular section.

4. A fluid flow control device as defined in claim 1 including a first fluid choke member secured in said valve seat means within said annular seat surface and a second fluid choke member secured within said tubular section of said valve means, said first choke member having a flow passage therethrough smaller in effective cross-sectional area than a flow passage through said second choke member and said flow passage through said second choke member being substantially less in cross-sectional area than the cross-sectional area of said circumferentially extending port means in said valve seat member.

5. A fluid flow control device as defined in claim 1 including a choke member having a flow passage therethrough substantially smaller than said flow passage through said body means secured within said flow passage through said body means at a fixed position at the other end of said valve means from the end of said valve means having said end seat surface for effecting a pressure differential in fluid flow through said device, and means providing fluid communication from within said flow passage through said body means on the side of said choke member away from said valve means into an annular space around said tubular section toward said valve seat means from said annular piston section whereby said valve means is exposed over first surfaces to fluid pressure within said device through said tubular section toward said valve seat means from said choke member and is exposed over second surfaces to fluid pressure from said flow passage through said body means on the side of said choke member away from said valve means whereby said valve means is actuated to move said end seat surface relative to said annular seat surface of said valve seat means for maintaining a predetermined pressure relationship within said tubular section relative to the pressure within said flow passage on the other side of said choke member whereby a substantially constant pressure differential is maintained across said choke member.

6. A fluid flow control device comprising: a body having a bore extending therethrough providing a fluid flow passage; a valve seat assembly secured within said body across said bore, said seat assembly including an annular resilient seat member providing an annular seat surface at a first side of said seat assembly, said seat assembly being provided with circumferential flow passage means spaced radially outwardly of said annular seat member; a valve assembly slidably supported within said bore and adapted to engage said seat assembly at one end, said valve assembly including a tubular section and an annular piston section, said piston section sliding in sealed relationship with respect to an inside wall of said body defining said bore through said body, seal means supported within said body around said tubular section between said annular piston and said valve seat assembly, said tubular section being smaller than said piston section and spaced within said bore of said body providing an annular chamber around said tubular section between said annular piston and said seal means supported with said body isolated from the bore through said tubular section; said valve assembly being adapted to be biased away from said seat assembly by fluid pressure within said annular space around said valve assembly; spring means confined between said body and said valve assembly biasing said valve assembly away from said seat assembly; said valve assembly being adapted to be biased toward said seat assembly by fluid pressure applied to said valve assembly from within said valve assembly; and a line of sealing engagement between said seal means around said tubular section and said tubular section having a diameter less than a line of sealing engagement between said valve assembly and said resilient valve seat member when said valve assembly is at a closed position whereby fluid pressure applied to said tubular section holds said valve assembly at a closed position after closing of said valve assembly.

7. A fluid flow control device comprising: a body having a bore therethrough providing a fluid flow passage; a valve seat assembly secured in said body transversely of said bore, said valve seat assembly including an annular resilient valve seat member providing an annular seat surface on one side of said seat assembly and having circumferentially extending fluid flow passage means therethrough radially outward of said seat member; a valve assembly movably supported within said bore of said body, said valve assembly including a tubular section and an annular piston section supported on said tubular section, said annular piston section sliding in sealed relationship with an inside wall of said body defining said bore through said body; guide ring means secured within said bore of said body between said annular piston and said valve seat assembly in sealed relationship, around said tubular section, said annular piston and said guide ring means defining ends of an annular space around said tubular section within said bore; an end of said tubular section nearest said valve seat assembly being adapted to engage said annular valve seat member of said seat assembly for preventing fluid flow through said flow control device; spring means positioned within said annular space around said tubular section confined between said piston and said guide ring for biasing said valve assembly away from said seat assembly; a line of sealing engagement between said annular piston section and a wall of said body defining said bore through said body and a line of sealing engagement between said guide ring means and said tubular section defining an annular area on said valve assembly exposed to fluid pressure within said valve assembly for biasing said valve assembly toward said seat assembly; a line of sealing engagement between said piston and wall of said body defining said bore through said body and the line of sealing engagement between said tubular section and said guide ring defining an annular area of said valve assembly exposed to fluid pressure within said annular space around said tubular section for biasing said valve assembly away from said seat assembly; the line of sealing engagement between said guide ring and said tubular section and a line of sealing engagement between said annular valve seat member of said seat assembly and the end of said tubular section nearest said valve seat assembly defining an annular area on said tubular section exposed to fluid pressure within said device around said tubular section for biasing said valve assembly toward the closed position after said valve assembly has been moved to said closed position to minimize leakage between said tubular section and said annular valve seat member.

8. A flow control device as defined in claim 7 wherein said valve seat assembly is provided with fluid flow passage means extending to said resilient annular valve seat member for exposing said valve seat member to the maximum fluid pressure to be sealed by contact between said valve seat member and said tubular section of said valve assembly.

9. A fluid flow control device as defined in claim 7 wherein first fluid flow restriction means is supported through said valve seat assembly, second means providing a flow restriction is supported in said tubular section, said second fluid flow restriction means has a flow passage therethrough larger than a flow passage through said first fluid flow restriction means whereby fluid flows at one rate through said device when said valve assembly is at an open position permitting fluid flow through said second fluid flow restriction means and fluid flows through said device at a second lower rate through said first fluid flow restriction means when said valve assembly is moved to a closed position relative to said valve seat assembly thereby limiting fluid flow through said device to said first fluid flow restriction means.

10. A fluid flow control device as defined in claim 7 including a sleeve assembly adapted to receive said annular piston and having means providing a fluid flow restriction at the end of said annular piston opposite said valve seat assembly, and means providing fluid communication from said bore through said body on the side of said sleeve assembly opposite said valve assembly into said annular space around said tubular section of said valve assembly between said guide and said annular piston whereby said valve assembly is biased away from said valve seat assembly by fluid pressure within said bore of said device on the side of said flow restriction means of said sleeve assembly away from said valve assembly, and said valve assembly is biased toward said valve seat assembly by fluid pressure on the side of said flow restriction means through said sleeve assembly adjacent to said valve assembly, said valve assembly being movable relative to said valve seat assembly responsive to the relative pressure differentital between opposite sides of said flow restriction means through said sleeve assembly.

11. A fluid flow control device comprising: means providing a body having a fluid flow passage extending therethrough; means secured with said body providing a valve seat assembly extending transversely of said flow passage, said valve seat assembly including an annular valve seat member providing a seat surface at a first side of said valve seat assembly, said valve seat assembly having flow passage means radially outward of said valve seat member, and said valve seat assembly having means providing first fluid flow restriction means through said assembly within said annular valve seat member; a valve assembly movably supported within said flow passage of said body means on said first side of said seat assembly, an end of said valve assembly adjacent to said valve seat assembly being adapted to coact with said annular valve seat member at one end position of said valve assembly to prevent fluid flow from said flow passage means radially outward of said annular valve seat member into said valve assembly; said valve assembly including second fluid flow restriction means adapted to pass fluid at a higher rate than said first fluid flow restriction means whereby when said valve assembly is at an open position spaced from said valve seat assembly fluid flows through said flow passage means radially outward of said annular valve seat member into said valve assembly through said second flow restriction means and when said valve assembly is at a closed position engaged with said valve seat assembly fluid flow is limited to a lower rate through said first fluid flow restriction means through said valve seat assembly within said annular valve seat member; said valve assembly including annular piston means sliding in sealed relationship within said flow passage means through said body means for biasing said valve assembly means toward said valve seat means responsive to fluid pressure within said flow passage on the side of said second flow restriction means away from said valve seat assembly means; and means engaged between said body means and said valve assembly means biasing said valve assembly means away from said valve seat assembly means.

12. A fluid flow control device comprising: a body having a bore therethrough forming a flow passage; a valve seat secured within said body transversly of said flow passage; a valve positioned within said flow passage adapted to move along said flow passage relative to said seat for regulating fluid flow between said seat and said valve to provide a variable fluid restriction across said flow passage; means secured within said body across said flow passage at the end of said valve assembly opposite said seat providing a fixed size fluid flow restriction within said flow passage; and means providing fluid communication between said flow passage on the side of said fixed flow restriction away from said valve into an annular space around said valve on the other side of said fixed flow restriction means whereby said valve is movable responsive to fluid pressure from said flow passage on the side of said fixed flow restriction away from said valve to adjust said variable flow restriction for maintaining a substantially fixed pressure differential across said fixed flow restriction.

13. A fluid flow control device comprising: a body having a flow passage extending therethrough; a valve seat having port means therethrough secured across said flow passage; a tubular valve positioned within and adapted to move along said flow passage relative to said valve seat for controlling fluid flow through said flow passage of said body; and axial orifice means removably secured in said flow passage of said body providing a replaceable axial flow restricting orifice in said flow passage of said body at an end of said tubular valve opposite the end of said valve adjacent to said valve seat; and means for conducting fluid pressure on the downstream side of said flow restricting orifice means past said orifice means to said valve to act on said valve, whereby said valve is adjusted respective to said valve seat for maintaining a substantially fixed pressure differential across said flow restricting orifice.

References Cited

UNITED STATES PATENTS

| | | | |
|---|---|---|---|
| 614,441 | 11/1898 | Burnett | 137—505.25 |
| 762,274 | 6/1904 | Bourseau | 137—505.25 |
| 2,800,141 | 7/1957 | Hedland | 137—504 XR |
| 3,170,481 | 2/1965 | Presnell | 137—504 XR |

M. CARY NELSON, *Primary Examiner.*

ROBERT J. MILLER, *Assistant Examiner.*